United States Patent
Pelon

(10) Patent No.: US 7,650,364 B2
(45) Date of Patent: Jan. 19, 2010

(54) PORTABLE DATABASE SYSTEM

(75) Inventor: Frederick Joseph Pelon, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 469 days.

(21) Appl. No.: 10/268,864

(22) Filed: Oct. 9, 2002

(65) Prior Publication Data

US 2004/0073567 A1 Apr. 15, 2004

(51) Int. Cl.
G06F 7/00 (2006.01)
G06F 17/30 (2006.01)

(52) U.S. Cl. .................. 707/201; 707/102; 707/104.1

(58) Field of Classification Search ............. 707/1–10, 707/20–204; 709/203, 223–224, 23
See application file for complete search history.

(56) References Cited

U.S. PATENT DOCUMENTS

| | | | | |
|---|---|---|---|---|
| 5,511,214 A * | 4/1996 | Yamada | .................. | 718/103 |
| 5,710,922 A * | 1/1998 | Alley et al. | .................. | 707/201 |
| 5,727,202 A * | 3/1998 | Kucala | .................. | 707/10 |
| 5,729,735 A * | 3/1998 | Meyering | .................. | 707/10 |
| 5,758,355 A * | 5/1998 | Buchanan | .................. | 707/201 |
| 5,845,282 A * | 12/1998 | Alley et al. | .................. | 707/10 |
| 5,899,998 A * | 5/1999 | McGauley et al. | .................. | 707/104.1 |
| 5,970,502 A * | 10/1999 | Salkewicz et al. | .................. | 707/201 |
| 5,974,238 A * | 10/1999 | Chase, Jr. | .................. | 709/248 |
| 6,000,000 A * | 12/1999 | Hawkins et al. | .................. | 707/201 |
| 6,000,274 A * | 12/1999 | Lai et al. | .................. | 73/23.35 |
| 6,034,621 A * | 3/2000 | Kaufman | .................. | 340/7.21 |
| 6,052,735 A * | 4/2000 | Ulrich et al. | .................. | 709/236 |
| 6,073,141 A * | 6/2000 | Salazar | .................. | 707/204 |
| 6,163,274 A * | 12/2000 | Lindgren | .................. | 340/7.29 |
| 6,167,379 A * | 12/2000 | Dean et al. | .................. | 705/9 |
| 6,219,694 B1 * | 4/2001 | Lazaridis et al. | .................. | 709/206 |
| 6,243,705 B1 * | 6/2001 | Kucala | .................. | 707/10 |
| 6,263,347 B1 * | 7/2001 | Kobayashi et al. | .................. | 707/201 |
| 6,272,545 B1 * | 8/2001 | Flanagin et al. | .................. | 709/228 |
| 6,430,541 B1 * | 8/2002 | Brown et al. | .................. | 705/28 |
| 6,457,062 B1 * | 9/2002 | Pivowar et al. | .................. | 709/248 |
| 6,496,979 B1 * | 12/2002 | Chen et al. | .................. | 717/178 |
| 6,516,327 B1 * | 2/2003 | Zondervan et al. | .................. | 707/200 |
| 6,532,480 B1 * | 3/2003 | Boothby | .................. | 707/201 |
| 6,549,902 B1 * | 4/2003 | Iwai | .................. | 707/8 |
| 6,549,917 B1 * | 4/2003 | Pollard et al. | .................. | 707/201 |
| 6,557,134 B2 * | 4/2003 | Bims et al. | .................. | 714/748 |
| 6,574,377 B1 * | 6/2003 | Cahill et al. | .................. | 382/305 |
| 6,654,787 B1 * | 11/2003 | Aronson et al. | .................. | 709/206 |
| 6,658,062 B1 * | 12/2003 | Nakatsuyama | .................. | 375/259 |
| 6,662,193 B1 * | 12/2003 | Christensen | .................. | 707/104.1 |
| 6,711,578 B1 * | 3/2004 | McCaw et al. | .................. | 707/101 |
| 6,728,530 B1 * | 4/2004 | Heinonen et al. | .................. | 455/414.1 |

(Continued)

Primary Examiner—Miranda Le

(57) ABSTRACT

An improved method of storing databases in a portable computer is provided to reduce and optimize storage space required while ensuring accessibility to user-required data. An improved method of interchanging data records between a master computer and a portable computer is also provided. In the present invention, attributes are assigned to data records and data fields to indicate relevance of the record or field to a user in different circumstances. Only the data records and data fields relevant to a user's current circumstance are downloaded to the portable computer. A change in circumstance of a user is tracked by a change in attribute, which triggers replacement or interchange of existing data records with data records that are relevant to the user's current circumstance.

28 Claims, 5 Drawing Sheets

U.S. PATENT DOCUMENTS

| | | | |
|---|---|---|---|
| 6,728,734 B2* | 4/2004 | Nolan et al. | 707/201 |
| 6,785,868 B1* | 8/2004 | Raff | 715/530 |
| 6,820,088 B1* | 11/2004 | Hind et al. | 707/101 |
| 6,829,622 B2* | 12/2004 | Beyda | 707/203 |
| 6,993,576 B1* | 1/2006 | Labedz et al. | 709/223 |
| 7,000,032 B2* | 2/2006 | Kloba et al. | 709/248 |
| 7,013,316 B1* | 3/2006 | Hansen et al. | 707/204 |
| 7,024,430 B1* | 4/2006 | Ingraham et al. | 707/201 |
| 7,039,656 B1* | 5/2006 | Tsai et al. | 707/201 |
| 7,076,567 B1* | 7/2006 | Chasman et al. | 709/248 |
| 7,136,912 B2* | 11/2006 | Hotti | 709/223 |
| 7,209,911 B2* | 4/2007 | Boothby et al. | 707/2 |
| 7,328,049 B2* | 2/2008 | Chanut | 455/574 |
| 7,346,668 B2* | 3/2008 | Willis | 709/219 |
| 2001/0005364 A1* | 6/2001 | Kang | 370/350 |
| 2001/0011308 A1* | 8/2001 | Clark et al. | 710/20 |
| 2002/0032722 A1* | 3/2002 | Baynes et al. | 709/202 |
| 2002/0046296 A1* | 4/2002 | Kloba et al. | 709/248 |
| 2002/0052781 A1* | 5/2002 | Aufricht et al. | 705/14 |
| 2002/0078075 A1* | 6/2002 | Colson et al. | 707/204 |
| 2002/0102997 A1* | 8/2002 | Pan | 455/462 |
| 2002/0120696 A1* | 8/2002 | Mousseau et al. | 709/206 |
| 2002/0131572 A1* | 9/2002 | Paradis | 379/200 |
| 2002/0133437 A1* | 9/2002 | Ansley | 705/35 |
| 2002/0161735 A1* | 10/2002 | Cheng et al. | 707/1 |
| 2003/0023619 A1* | 1/2003 | Beyda | 707/203 |
| 2003/0028542 A1* | 2/2003 | Muttik et al. | 707/100 |
| 2003/0046304 A1* | 3/2003 | Peskin et al. | 707/104.1 |
| 2003/0046433 A1* | 3/2003 | Luzzatti et al. | 709/248 |
| 2003/0069874 A1* | 4/2003 | Hertzog et al. | 707/1 |
| 2003/0125057 A1* | 7/2003 | Pesola | 455/502 |
| 2003/0144966 A1* | 7/2003 | Friedmann et al. | 705/67 |
| 2003/0159136 A1* | 8/2003 | Huang et al. | 717/171 |
| 2003/0225797 A1* | 12/2003 | Shields et al. | 707/202 |
| 2004/0025072 A1* | 2/2004 | Mau | 713/400 |
| 2004/0034668 A1* | 2/2004 | Gotz et al. | 707/201 |
| 2006/0154603 A1* | 7/2006 | Sachs et al. | 455/39 |
| 2007/0016695 A1* | 1/2007 | Rabbers et al. | 709/248 |

* cited by examiner

PORTABLE DATABASE SYSTEM

BACKGROUND OF THE INVENTION

1. Field of the Invention

The present invention relates to portable database systems. More particularly, it relates to an improved method of storing databases in a portable computer and an improved method of interchanging data records between a master and a portable computer.

2. Description of Background Information

Database systems allow storing and retrieving of data records relating to critical business information, such as customer information, stock quotes and inventory availability; or to personal information, such as nutrition and road direction information. Storage space required for storing the data records varies according to the number and volume of the data records. In non-portable computers, storage space may be quite easily expanded to provide for large databases. In portable computers, due to need for portability, expansion of storage space is comparatively more constrained.

Portable computers typically refer to laptops, notebooks, Personal Digital Assistants (PDAs) and palmtop organizers. They are designed to allow users perform computing tasks and manage personal information while the users are travelling. Users can also depend on their portable computers to retrieve information from a master database residing in a master computer. For example, a travelling salesman may need to access price and stock availability for a particular product. He can make a telephone call to relay his request for information, or he can retrieve such information from a database stored in a portable computer. For the latter, a copy of the database has to be first downloaded into his portable computer—this copy of database is hereafter referred to as a "portable database". When changes are effected at the master database or at the portable database, both the master and the portable databases need to be updated through a synchronization process to ensure the data is up-to-date.

In existing solutions, portable databases are merely replicas of the master database, containing complete data structure and all data records. While this solution ensures completeness of the portable database, a potential problem is insufficient and inefficient utilization of storage space in the portable computer. Generally, the storage capacity of memory of a portable computer is a few orders of magnitude smaller than that of a master computer. Portable computers are also usually lightweight and have small form factor to serve its purpose as a portable device, and hence are preferably not attached to bulky storage devices. Thus, in order to store a copy of a master database in the portable computer, a significant portion of the storage space of the portable computer may be needed. In some instances where there is complex data structure or large data volume, the portable computer storage may even be insufficient to store the entire master database.

To overcome insufficient storage, existing solutions propose downloading only the data fields relevant to a user's needs. While this solution significantly reduces storage needs, it still allows downloading the same number of data records, which include a potentially large number of unneeded data records.

From the foregoing, an improved method of storing databases in a portable computer and an improved method of interchanging data between a master and a portable computer are needed.

SUMMARY OF THE INVENTION

The present invention provides an improved method of storing a database in a portable computer for optimizing storage space requirements while ensuring accessibility to user-required data. The present invention also provides an improved method of interchanging data records between a master and a portable computer. More particularly, data records and data fields of a master database are selectively downloaded into a portable computer and selectively removed or deleted when they are not required. The selection of data records and field for downloading is based on attributes assigned to each data record and data field. The attributes represent conditions to determine whether to download or remove the data record or data field in a given circumstance. The selection and removal are performed intelligently and automatically in accordance with the present invention.

Separate series of attributes are assigned to data records and data fields to categorize them for the selection process described above. A first series of attributes ("trigger attributes") functions as a trigger for initiating a change in contents of the portable database. One example is a time-based attribute. A second separate series of attributes ("priority attributes") indicates further conditions for downloading a data record into a portable database. For example, the second series indicates an order of priority of downloading the data records when storage space in the portable computer may be insufficient to accommodate all relevant records. A third separate series of attributes ("tags") may be assigned to data fields to indicate whether or not the data field is to be downloaded into the portable database.

During a synchronization activity between a portable and a master computer, a current trigger attribute is determined. The current trigger attribute is compared with the trigger attributes of existing data records in the portable database. The trigger attributes of the existing data records in the portable database are generally identical because in accordance with the present invention; only those data records having identical trigger attributes are downloaded into the portable computer. If the current trigger attribute and the trigger attributes of the existing data records in the portable database differ, the existing data records in the portable database will be interchanged with current relevant records that were assigned with the current trigger attribute. If they are identical, the current data records are still relevant in relation to the current trigger attribute, and hence no changes in the portable database are needed.

However, not all current relevant records assigned with the current trigger attribute are downloaded into the portable database. Based on a second series of attributes, viz. priority attributes, a selection of these relevant records are accordingly downloaded. Based on a third series of attributes, viz. tags, a selection of data fields are accordingly downloaded.

With the present invention, a portable computer user is able to access a complete range of database records required according to his circumstance and profiled needs while minimizing and optimizing storage space needed to store the portable database. The present invention also provides an improved method of interchanging data records between a master and a portable computer, including replacing existing data records with more relevant records, updating modified records and uploading records into a master database.

BRIEF DESCRIPTION OF THE DRAWINGS

The present invention will be described with reference to the drawings, in which.

DETAILED DESCRIPTION

Figure 1:
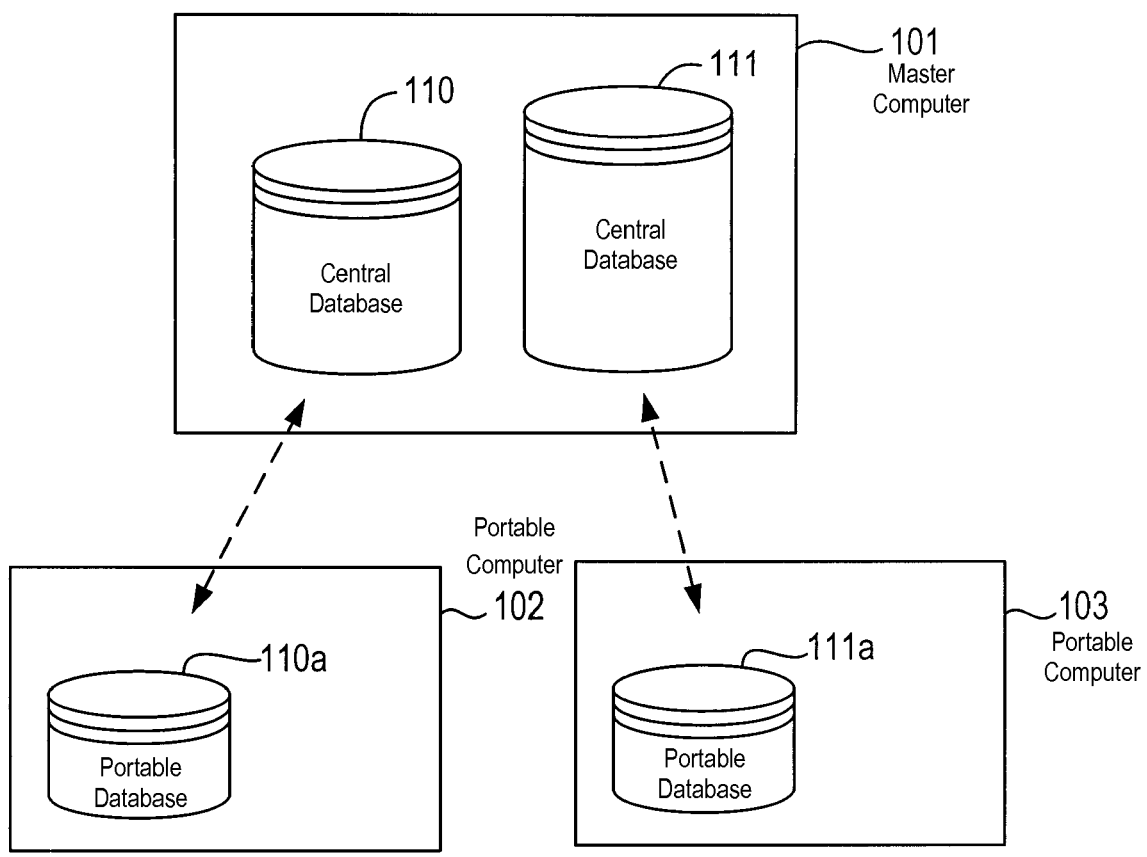
FIG. 1 shows a schematic representation of a master and a portable computer, and master and portable databases in the present invention.

FIG. 1 shows a block diagram illustrating the interactions between a master computer 101 and portable computers 102, 103. The master computer 101 typically contains one or more master or central databases 110, 111 where data records are stored and retrievable. While the master database may have copies stored in other computer systems, the master database is generally the most complete and up-to-date. The master computer 101 may be linked to several other computer systems such as portable computers 102, 103 by wired or wireless connection known in the art.

In accordance with the present invention, a copy of the master data file is stored in the portable computer and is synchronized with the master data file periodically or when a user initiates a synchronization action. The size of the portable database 110a, 11a is generally a fraction of the master data file. The selective portable database according to the present invention not only reduces storage required in the portable computer but also provides a user access to data records he needs according to his circumstance. This selective database is obtained by downloading only a selection of data records that have been determined to be relevant to the user according to his current circumstance. Data records downloaded into the portable computer may be replaced or modified when the user's circumstance changes. According to the present invention, the user's circumstance is represented by trigger attributes, where a change in this attribute triggers a change in contents of the portable database. During such changes, the existing set of data records are interchanged with another set of data records that are more relevant to the user's present circumstance.

The operational aspects of the present invention will be described with reference to FIGS. 2, 3, 4 and 5 based on a "diet database" example. The "diet database" contains nutritional information on various food items to assist a user plan his daily diet. An extract of the "diet database" is appended for illustration purposes.

1. Name: Skim milk, 8 fl. oz.
    a. Time Cache: Breakfast
        i. Priority 1
    b. Calories: 85.5
        i. Critical
    c. Total fat: 0.1 g
        i. Critical
    d. Saturated Fat: 0.1 g
        i. Critical
    e. Cholesterol: 4.4 mg
        i. Non-critical
    f. Riboflavin: 0.3 mg
        i. Non-critical 2. Name: Farley's Fruit Snacks, 2.5 oz
    a. Time Cache: Lunch
        i. Priority 2
    b. Calories: 90
        i. Critical
    c. Total fat: 0 g
        i. Critical
    d. Saturated Fat: 0 g
        i. Critical
    e. Cholesterol: 0 mg
        i. Non-critical
    f. Riboflavin: 0 mg
        i. Non-critical 3. Name: Cheddar Cheese, 4 oz.
    a. Time Cache: Dinner
        i. Priority 3
    b. Calories: 451
        i. Critical
    c. Total fat: 37.1 g
        i. Critical
    d. Saturated Fat: 23.6 g
        i. Critical
    e. Cholesterol: 117.5 mg
        i. Non-critical
    f. Riboflavin: 0.4 mg
        i. Non-critical 4. Name: Beer, Ale, Porter, 12 fl. oz.
    a. Time Cache: Dinner
        i. Priority 1
    b. Calories: 200
        i. Critical
    c. Total fat: 0 g
        i. Critical
    d. Saturated Fat: 0 g
        i. Critical
    e. Cholesterol: 0 mg
        i. Non-critical
    f. Riboflavin: 0.1 mg
        i. Non-critical 5. Name: Low-fat Microwave Popcorn, one bag
    a. Time Cache: Dinner
        i. Priority 2
    b. Calories: 200
        i. Critical
    c. Total fat: 4 g
        i. Critical
    d. Saturated Fat: 0 g
        i. Critical
    e. Cholesterol: 0 mg
        i. Non-critical
    f. Riboflavin: 0 mg
        i. Non-critical In the "diet database" example, each of the five data records or food items are assigned a trigger attribute from a time-based series, namely: breakfast, lunch and dinner. The time-based attribute, in this example, functions as the trigger attribute for effecting changes to the portable database. Preferably, each attribute may be assigned to a specified time range. For example, the "breakfast" attribute is arbitrarily assigned a time range of 5.00 a.m. to 9.00 a.m.; the "lunch" attribute is assigned a time range of 9.01 a.m. to 2.00 p.m.; and the "dinner" attribute is assigned a time range of 2.01 p.m. to 8.00 p.m. At the time of synchronizing the portable computer with a master computer, the existing data records of the portable database are ascertained whether or not they conform to the current time-based attribute. If the data records in the portable database do not conform to the current time-based attribute, they are removed and replaced with the relevant data records. If the data records in the portable database conform to the time-based attribute at the time of synchronization, the data records in the portable database are generally unchanged, unless there are modifications to the data records.

Apart from the trigger attribute, each data record may be assigned a priority attribute for determining whether or not the data record should be downloaded to the portable database especially when storage space is scarce or insufficient to accommodate all the relevant data records. The priority attribute may be an attribute series separate from the time-based attribute. In the example, "Priority 1" indicates that the data record is always downloaded to the portable database; "Priority 2" indicates that the data record is downloaded to the portable database if there is sufficient storage; and "Priority 3" indicates that the data record is never downloaded to the portable database. The priority attribute may remain unchanged or adjusted upwards or downwards based on frequency of use.

Each data field of a data record may also be assigned a tag for determining whether or not to download the data field contents to the portable database. The tags assigned to the data fields may also be separate from the trigger and priority attributes. In the current example, a "critical" tag indicates that data in a field is downloaded to the portable database. A "non-critical" tag indicates that data in the field is not downloaded to the portable database.

The following paragraphs describe the operation of the present invention from the perspectives of both portable and master computer.

Figure 2:
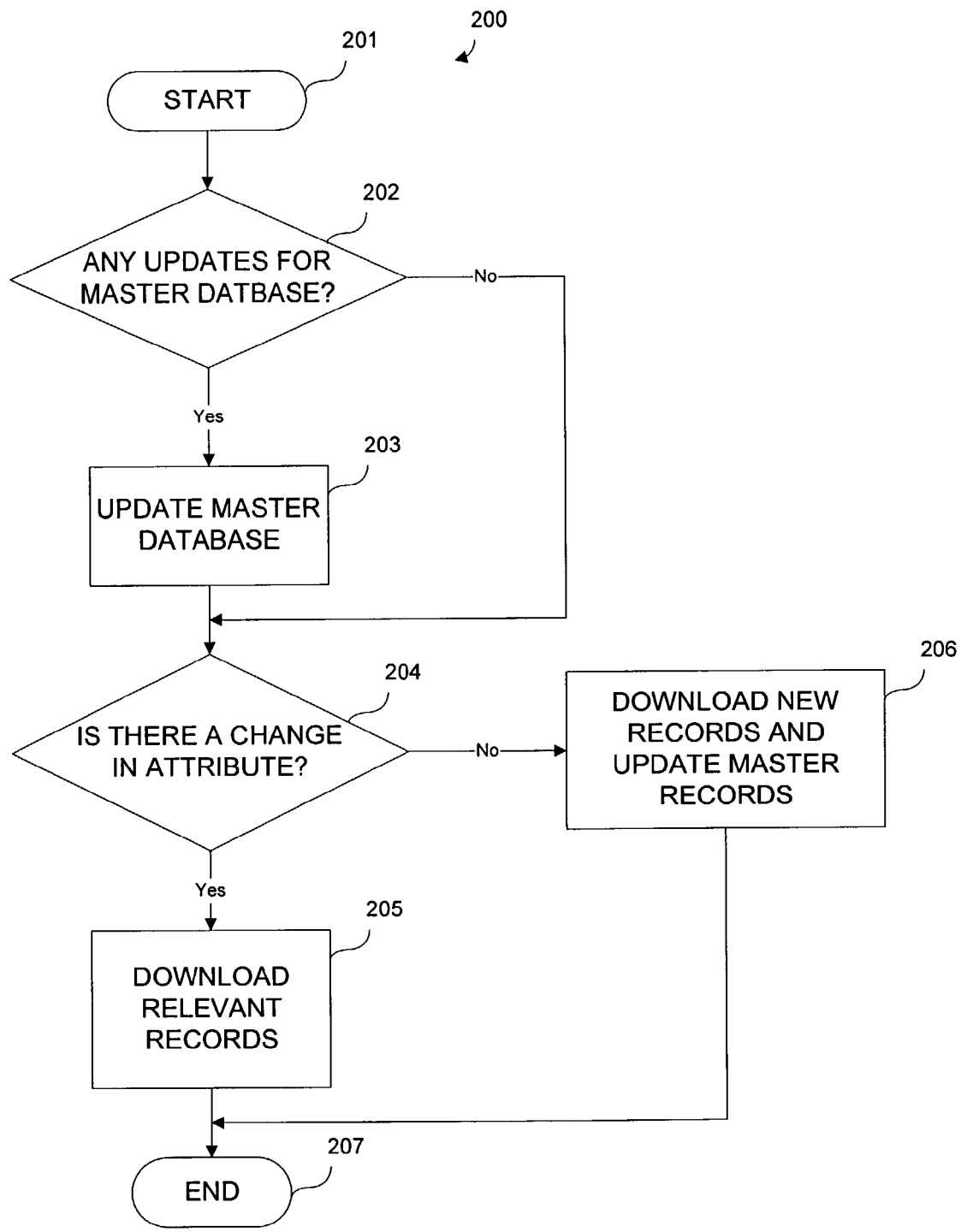
FIG. 2 shows a flow diagram of a synchronization activity from the perspective of a portable computer.

FIG. 2 illustrates the operation of a portable computer during synchronization with the master computer. A sequence 200 in FIG. 2 begins in a START step 201 when a link is established between a portable computer and a master computer for synchronization activity. The link may be established using wired or wireless connection in a manner known in the art. The master computer ascertains a presence of new records in an ANY UPDATES FOR MASTER DATABASE? decision step 202. New data records are identified for uploading to the master database if a user of the portable computer has, prior to the synchronization, modified the portable database by adding or deleting data records, or modifying data contents. If there are records for updating to the master databases, the ANY UPDATES FOR MASTER DATABASE? decision step 202 then proceeds to an UPDATE MASTER DATABASE step 203, where these records are uploaded to the master database accordingly. Thereafter, the sequence 200 proceeds to an IS THERE A CHANGE IN ATTRIBUTE? step 204. In the UPDATES FOR MASTER DATABASE? decision step 202, if there is no modification in the portable database, sequence 200 skips to the IS THERE A CHANGE IN ATTRIBUTE? decision step 204.

In the IS THERE A CHANGE IN ATTRIBUTE? decision step 204, the current trigger attribute is determined. The current attribute is then compared against the attribute of the existing data records of the portable database. According to the present invention, the existing data records of the portable database have generally identical time-based attributes because the selection of data records for downloading from the master database to the portable database is primarily based on this attribute. Exceptions may occur when a user creates new data records in the portable computer, which may not necessarily have same attributes, or modifies attributes of existing records. The new or modified data records are generally not considered in the IS THERE A CHANGE IN ATTRIBUTE? decision step 204.

Using the "diet database" example, the trigger attribute of interest in this step 204 is the time-based attribute. If the user had last initiated a synchronization at 7.30 a.m., the existing data records residing in the portable database generally relates to the "breakfast" attribute. If the time of the current synchronization is arbitrarily assumed to be 4.00 p.m., the current trigger attribute is "dinner." Since the current attribute, viz. "dinner," does not match the attribute of most existing data records in the portable database, viz. "breakfast," the existing data records of the portable database need to be updated. More specifically, the data records with the "breakfast" and non "dinner" attributes are removed or deleted from the portable database. Data records relating to the "dinner" attributes are identified as current relevant records and downloaded from the master database into the portable database in a DOWNLOAD RELEVANT RECORDS step 205. In the "diet database" example, data records 3, 4 and 5 will replace data record 1.

The data records 3, 4 and 5 are assigned different priority attributes: "priority 3," "priority 1" and "priority 2" respectively. If storage in the portable computer is sufficient, all three data records 3, 4, 5 are downloaded into the portable computer. However, if storage space is insufficient, the records are selectively downloaded according to their assigned priority attribute. Further, data fields of the records 3, 4 and 5 are selectively downloaded according to their assigned tags. Data fields assigned with a "critical" tag, viz. "calories," "total fat" and "saturated fat," are downloaded. Data fields assigned with a "non-critical" tag, viz. "cholesterol" and "riboflavin," are not downloaded into the portable database. When downloading is complete, the sequence 200 proceeds to an END step 207.

If the current attribute is identical to the attribute of the existing data records in the portable database, the IS THERE A CHANGE IN ATTRIBUTE? decision step 204 proceeds to a DOWNLOAD NEW RECORDS AND UPDATE MASTER RECORDS step 206. In this step, if there are newly created or modified or deleted records in the master database which have not been downloaded into the portable database since the last synchronization and which also conform to the current trigger attribute, these newly created records are downloaded into the portable database. Modified records from the portable are also updated into the master database. When downloading and updating are complete, the sequence 200 proceeds to an END step 207.

Figure 3:
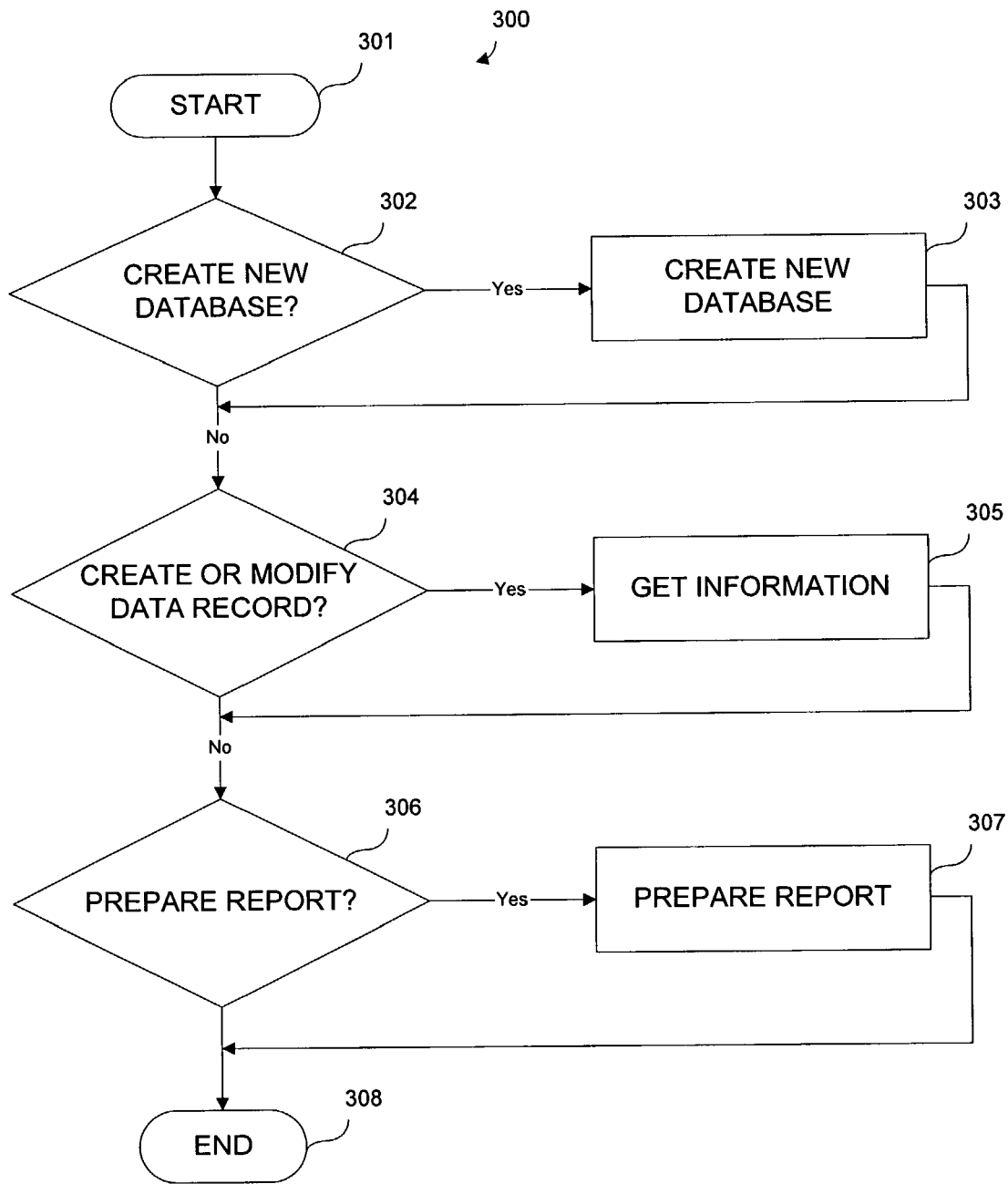
FIG. 3 shows a flow diagram of the operation of a portable computer when it is remote from a master computer.

FIG. 3 illustrates the operation of the portable computer when it is remote from the master computer or not connected to the master computer. A sequence 300 in FIG. 3 begins in a START step 301 when a user accesses or activates the database program or portable database. A user of the present invention may be presented with at least three options: create a new database, create or modify records in an existing database, and prepare reports.

If the user wants to create a new database, the START step 301 proceeds through a CREATE NEW DATABASE? decision step 302 to a CREATE NEW DATABASE step 303, where a new database is created. The user may customize the database structure by specifying data fields, data formats and the like. In accordance with the present invention, the user may also assign attributes (e.g., time-based attributes, or priority attributes or tags) in this step.

If the user wants to add new data records into the new database or an existing database, or modify an existing data record in an existing database, or specify or modify attributes, the sequence 300 proceeds through a CREATE OR MODIFY DATA RECORD? decision step 304 to a GET INFORMATION step 305. In this step, a user can add or modify data records and save the new or modified data into the portable computer in a manner known in the art.

If the user wants to prepare a report on the newly created or an existing database, the sequence 300 proceeds through a PREPARE REPORT? decision step 306 to a PREPARE REPORT step 307. A user can prepare a report by extracting or selecting parts of the database for compilation. The report can then be sent to a peripheral device such as a printer, or saved as a separate file for future handling. The extraction or selection of data records for preparing the report can be performed on the portable database, but a potential inaccuracy may arise since the portable database may not reflect the most current data. To overcome this problem, extraction or selection of data records can be performed on the master database during a next synchronization of the portable computer with the master computer (see later paragraphs for detailed description). Nevertheless, the user can choose either method according to his requirement.

If the user does not want to prepare a report, or if the report preparation is complete, or if the preparation is withheld until the next synchronization, the sequence 300 then proceeds to an END step 308.

Figure 4:
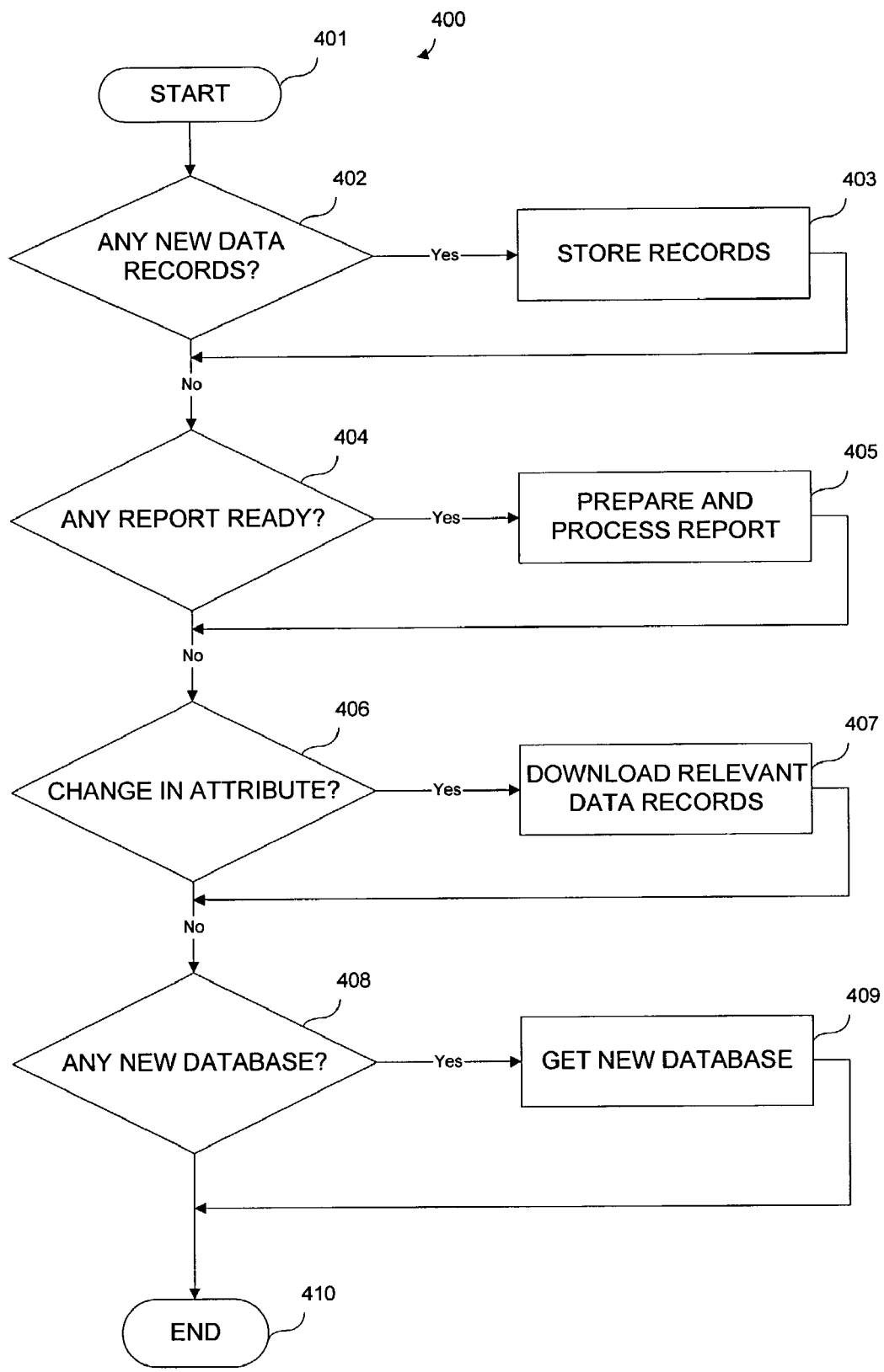
FIG. 4 shows a flow diagram of a synchronization activity from the perspective of a master computer.

FIG. 4 illustrates a synchronization operation from the perspective of a master computer. A sequence 400 in FIG. 4 begins with a START step 401 when a link is established for synchronization between a portable and a master computer. The master computer ascertains whether there are any new or modified data records for uploading from the portable database in an ANY NEW DATA RECORDS? decision step 402. Such data records are generally created in the portable computers and have not been uploaded into the master database. The new or modified records are identified and uploaded into the master database in a STORE RECORDS step 403.

When the new data records have been stored in the master database, or if there are no new data records for updating in the master database, the sequence 400 proceeds to an ANY REPORT READY? decision step 404. As described in the earlier paragraphs, the present invention allows reports to be prepared using data records from the portable or the master database. In this step, it is determined whether any report needs to be prepared using data records from the master database. If a user had chosen to prepare a report using the master database, or if a prepared report is to be further processed or handled, the sequence proceeds to a PREPARE REPORT step 405, where the required report is compiled from the data contents in the master database. A prepared report can be processed or handled in several ways: sending to printer for printing, sending to a facsimile machine for transmission, sending as an electronic mail attachment, and saving as a separate file for future retrieval.

When the report is processed, or if there is no report action, the sequence 400 proceeds to a CHANGE IN ATTRIBUTE? decision step 406. In this step, the current trigger is determined and compared against the trigger attribute of most existing data records in the portable database. Using the previous example, existing data records of the portable database are associated with the "breakfast" attribute. If the time of the current synchronization is arbitrarily assumed to be 4.00 p.m., the current trigger attribute is "dinner." With the change of trigger attribute since the last synchronization, data records associated with the "dinner" attribute are identified as current relevant records and downloaded into the portable database, hence removing and replacing the "breakfast" related data records in a DOWNLOAD RELEVANT DATA RECORDS step 407.

When the download is complete or if the attribute has not changed, the sequence 400 proceeds to an ANY NEW DATABASE? decision step 408. As described in the earlier paragraphs, a new database can be created by a user of a portable computer. The newly created database can be uploaded to the master computer in a next synchronization. In the ANY NEW DATABASE? decision step 408, the master database checks for any such newly created database in the portable database. If there is, the newly created database is uploaded into the master database in a GET NEW DATABASE step 409.

Figure 5:
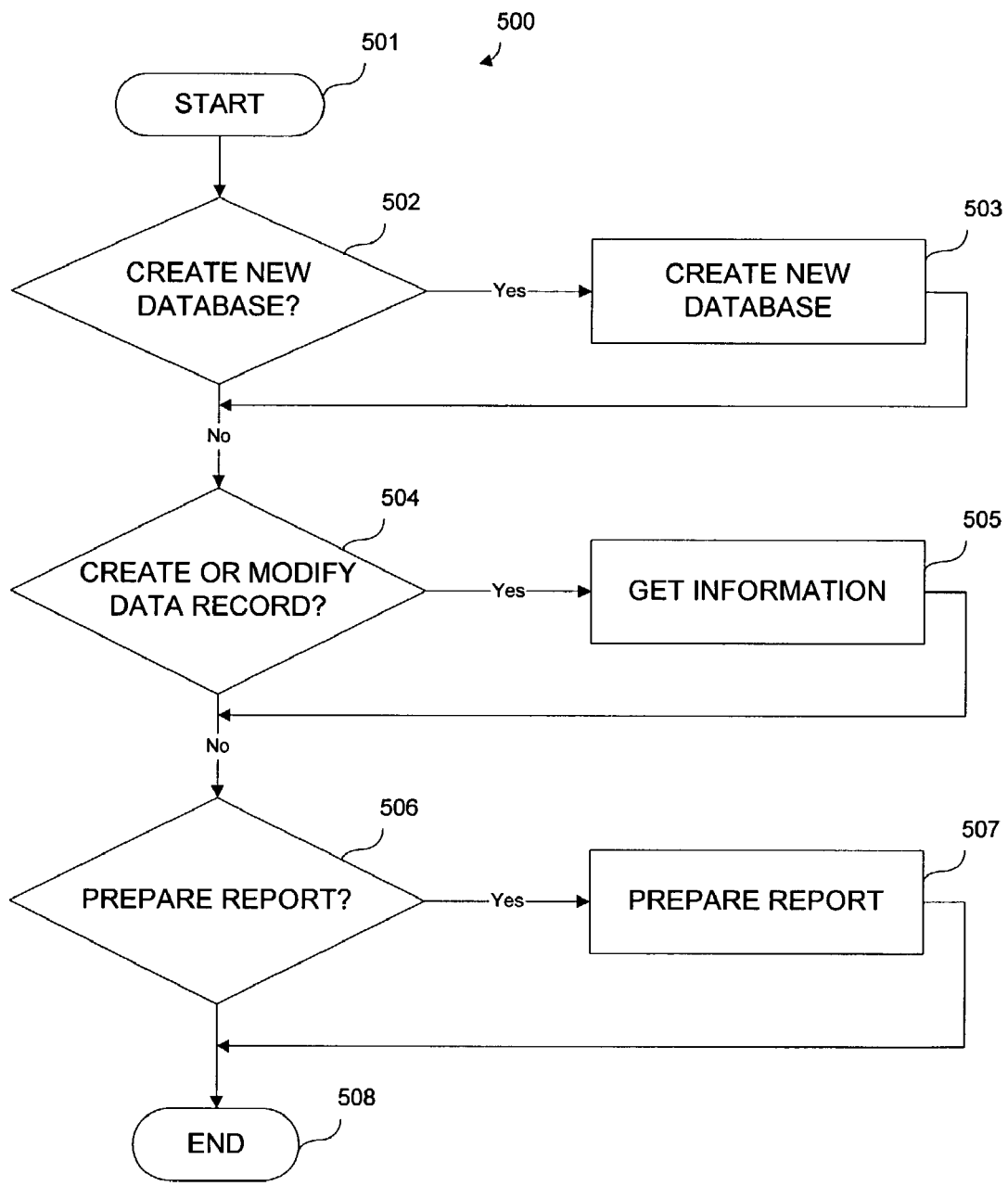
FIG. 5 shows a flow diagram of the operation of a master computer when it is remote from a portable computer.

FIG. 5 illustrates the operation of the master computer when it is remote from or unconnected to the portable computer. A sequence 500 in FIG. 5 begins in a START step 501 when a user accesses or activates a database program or a master database in the master computer. A user of the present invention may be presented with three options: add a new database, create or modify records in an existing database and process reports.

If the user wants to create a new database, the START step 501 proceeds through a CREATE NEW DATABASE? decision step 502 to a CREATE NEW DATABASE step 503, where a new database is created. The user may customize the database by specifying data fields and data format in a manner known in the art. In accordance with the present invention, the user may also assign attributes in this step.

If the user wants to add new data records in the new database or an existing database, or modify an existing data record in an existing database, or specify or modify attribute conditions, the sequence 500 proceeds through a CREATE OR MODIFY DATA RECORD? decision step 504 to a GET INFORMATION step 505. In this step 505, a user can add or modify records and saves the new or modified data in the master database in a manner known in the art.

If the user wants to process a report on the newly created or an existing database, the sequence 500 proceeds through a PREPARE REPORT? decision step 506 to a PREPARE REPORT step 507. A user can prepare a report by extracting or selecting parts of the database for compilation. The report can then be sent to a peripheral device such as a printer, or saved as a separate file for future retrieval.

If the user does not want to prepare a report, or the preparation is complete, or the preparation is withheld until the next synchronization, the sequence 500 then proceeds to an END step 508.

In the "diet database" example, the trigger attribute that initiates a change in contents of the portable database is time-based. Other attributes such as: location of the portable computer, weather and context of the user can be used in accordance with the present invention. An example of a context attribute is the name of a customer in a customer information database, where a user selects the name of a customer as an attribute for triggering change in portable database contents. In this particular example, the user or the database administrator does not need to associate an attribute with each data records since the attribute, viz. name of a customer, is generally part of the data content in a particular field of such databases.

Priority attributes are not limited to those described in the "diet database" example. Also, tags assigned to data fields may be customized according to a user's profile so that only relevant information are downloaded into the portable computer to restrict access of certain data contents to an exclusive or authorized group of users.

In the foregoing paragraphs, a change in trigger attribute initiates a change in data contents of a portable database during a synchronization activity between the portable and the master computer. Optionally, a synchronization activity may be prompted or initiated when a trigger attribute transits from one to another. The change in attributes may be detected automatically by the portable computer or at a user's manual input.

What is claimed is:

1. A data management method comprising:
   providing a master database storing records, each record including a trigger attribute stored with the record;
   providing a portable database configured to store a subset of the records;
   communicatively coupling the portable database to the master database;
   selecting a trigger attribute and a tag attribute;
   comparing the selected trigger attribute to records in the master database;
   identifying a set of two or more records in the master database having a trigger attribute matching the selected trigger attribute;
   identifying at least one field of each of the two or more records having a predefined tag attribute stored in the record and matching the selected tag attribute;
   identifying a priority attribute assigned to at least one of the two or more records, the priority attribute indication whether to transfer the at least one of the two or more records to the portable database based on an amount of storage space available thereon, wherein priority attribute is based on a frequency of use of the at least one of the two or more records;
   ensuring that the subset of records stored in the portable database contains only records corresponding to the identified set and fields corresponding to the selected tag attribute; and
   transferring at least one of the two or more records to the portable database.

2. The method of claim 1 further comprising determining whether to download at least one of the two or more records to the portable database based on an amount of storage space available on the portable database.

3. The method of claim 1 further comprising transferring the set of two or more records to the portable database.

4. The method of claim 1 further comprising deleting at least one record in the portable database not corresponding to the selected trigger attribute.

5. The method of claim 4 further comprising, prior to deleting the at least one record, updating the master database with at least one record that has been modified in the portable database.

6. The method of claim 4 further comprising, prior to deleting the at least one record, updating the master database with at least one record that has been created in the portable database.

7. The method of claim 1, wherein the selected trigger attribute is not specified by a user.

8. A data management method, comprising:
   providing a master database storing records, each record including a trigger attribute and a priority attribute stored with the record;
   providing on a portable computer a portable database configured to store a subset of the records;
   identifying at least one record to transfer from the master database to the portable database communicatively coupled thereto based on a selected trigger attribute;
   identifying a priority attribute assigned to the at least one record, the priority attribute indicating whether to transfer the at least one record to the portable database based on an amount of storage space available on the portable computer, the priority attribute selected from a set of options, one of the options being to transfer the at least one record regardless of the amount of storage space available;
   identifying a predefined tag attribute assigned to at least one field of the at least one record and stored with the at least one record, the tag attribute indicating whether to transfer content of the at least one field to the portable computer when the at least one record is transferred to the portable database; and
   transferring at least one record to the portable database.

9. The method of claim 8 further comprising changing the priority attribute of the at least one record based on a frequency of use of the at least one record.

10. The method of claim 8 further comprising downloading, based on the priority attribute, the at least one record to the portable computer if a sufficient amount of storage space is available on the portable computer.

11. The method of claim 8, wherein the priority attribute of the at least one record does not change.

12. The method of claim 8, wherein, prior to the transfer, the at least one record is in the master database but not in the portable database.

13. The method of claim 8, wherein the trigger attribute and the priority attribute are predefined for each record, wherein the trigger attribute can be different for different records, and wherein the priority attribute can be different for different records.

14. A data management method, comprising:
   providing a master computer including a master database storing records, each record including a trigger attribute stored with the record;
   providing a portable computer including a portable database configured to store a subset of the records;
   identify a priority attribute assigned to at least one of the records the priority attribute indicating whether to transfer the at least one of the records to the portable database based on an amount at storage space available thereon wherein the priority attribute is changed based on a frequency of use of the at least one of the records;
   automatically comparing a trigger attribute of each record stored in the portable database to a current trigger attribute in response to communicative coupling of the portable computer with the master computer, wherein the current trigger attribute is not specified by a user;
   if the trigger attribute of each record stored in the portable computer does not correspond to the current trigger attribute, automatically deleting each non-corresponding record from the portable computer; and
   transferring at least one of the records to the portable database.

15. The method of claim 14 further comprising replacing the each non-corresponding record in the portable computer with at least one record from the master computer having a trigger attribute corresponding to the current trigger attribute.

16. The method of claim 14 further comprising determining whether to download at least one record in the master computer to the portable computer based on an amount of storage space available on the portable computer.

17. The method of claim 14 further comprising identifying a predefined tag attribute assigned to at least one field of at least one record in the master computer and stored with the at least one record, the tag attribute indicating whether to transfer content of the at least one field to the portable computer when the at least one record is transferred to the portable database.

18. The method of claim 14, wherein the current trigger attribute is a characteristic of the portable computer.

19. The method of claim 18, wherein the current trigger attribute is a current time-of-day.

20. The method of claim 18, wherein the current trigger attribute is a current location.

21. The method of claim 18, wherein the current trigger attribute is a current weather condition.

22. A data management method comprising:
provinding a master database storing records, each record including a predefined trigger attribute stored with the record;
providing a portable database configured to store a subset of the records;
communicatively coupling the portable database to the master database;
identifying a plurality of records in the master database having a predefined trigger attribute matching a selected trigger attribute, wherein the selected trigger attribute is not specified by a user;
updating the master database with at least one record that has been modified in the portable database, and then deleting each record stored in the portable database not corresponding to the selected trigger attribute;
determining whether to download at least one of the plurality of records to the portable database based on an amount of storage space available on the portable database and a priority attribute assigned to the at least one record indicating whether to transfer the at least one record to the portable database based on the amount of storage space; and
transferring at least one of the plurality of records to the portable database.

23. The method of claim 22, further comprising changing the priority attribute of the at least one record based on a frequency of use of the at least one record.

24. The method of claim 22, further comprising, prior to deleting the each record, updating the master database with at least one record that has been created in the portable database.

25. The method of claim 22, wherein the selected trigger attribute is a characteristic of a portable computer having the portable database.

26. The method of claim 25, wherein the selected trigger attribute is a current time-of-day.

27. The method of claim 25, wherein the selected trigger attribute is a current location.

28. The method of claim 25, wherein the selected trigger attribute is a current weather condition.

* * * * *

UNITED STATES PATENT AND TRADEMARK OFFICE
CERTIFICATE OF CORRECTION

PATENT NO. : 7,650,364 B2  Page 1 of 1
APPLICATION NO. : 10/268864
DATED : January 19, 2010
INVENTOR(S) : Frederick Joseph Pelon It is certified that error appears in the above-identified patent and that said Letters Patent is hereby corrected as shown below:

In column 9, line 22, in Claim 1, delete "indication" and insert -- indicating --, therefor.

In column 9, line 25, in Claim 1, after "wherein" insert -- the --.

In column 10, line 34, in Claim 14, delete "identify" and insert -- identifying --, therefor.

In column 10, line 35, in Claim 14, after "records" insert -- , --.

In column 10, line 37, in Claim 14, delete "at" and insert -- of --, therefor.

In column 10, line 37, in Claim 14, delete "available thereon" and insert -- available thereon, --, therefor.

Signed and Sealed this

Twenty-seventh Day of April, 2010

David J. Kappos
*Director of the United States Patent and Trademark Office*